United States Patent
Hodge et al.

(10) Patent No.: US 8,925,409 B2
(45) Date of Patent: Jan. 6, 2015

(54) POSITIONING APPARATUS

(75) Inventors: Robert B. Hodge, Grants Pass, OR (US); Robert S. Hodge, Grants Pass, OR (US)

(73) Assignee: Siskiyou Design, Inc., Grants Pass, OR (US)

( * ) Notice: Subject to any disclaimer, the term of this patent is extended or adjusted under 35 U.S.C. 154(b) by 687 days.

(21) Appl. No.: 13/177,350

(22) Filed: Jul. 6, 2011

(65) Prior Publication Data

US 2013/0008268 A1 Jan. 10, 2013

(51) Int. Cl.
*F16H 21/44* (2006.01)
*F16H 21/54* (2006.01)
*F16H 25/18* (2006.01)

(52) U.S. Cl.
CPC ..................................... *F16H 25/18* (2013.01)
USPC ........................................................ 74/99 A

(58) Field of Classification Search
CPC ....... F16H 21/54; F16H 25/186; F16H 25/18; F16H 25/183; G02B 21/362; G02B 26/121
USPC .......... 74/99 A, 99 R, 102; 359/196.1, 198.1, 359/221.2

See application file for complete search history.

(56) References Cited

U.S. PATENT DOCUMENTS

| | | | | |
|---|---|---|---|---|
| 3,997,033 A * | 12/1976 | Bulmer | ......................... | 188/72.7 |
| 4,417,843 A * | 11/1983 | Bonga | ............................ | 414/676 |
| 5,282,393 A * | 2/1994 | Arnone et al. | ............. | 74/490.08 |
| 5,757,561 A * | 5/1998 | Sechrist et al. | ............... | 359/822 |
| 6,614,601 B2 * | 9/2003 | Dallakian | ..................... | 359/804 |
| 6,785,067 B1 * | 8/2004 | Andrews | ....................... | 359/819 |
| 7,982,980 B2 * | 7/2011 | Rigney | ........................... | 359/822 |

* cited by examiner

*Primary Examiner* — Justin Krause
(74) *Attorney, Agent, or Firm* — Chernoff Vilhauer LLP

(57) ABSTRACT

A positioning apparatus converts linear movement along a first axis into either linear movement along another axis or rotational movement. The apparatus includes a fixed element and one or more moveable elements which are moveable relative to the fixed element. A first guide element is attached to the fixed element and a second guide element is attached to the moveable element. An adjustment mechanism, which is associated with the first and second guide elements, is moveable relative to the fixed element along a first axis, and movement of the adjustment causes movement of the moveable element.

25 Claims, 10 Drawing Sheets

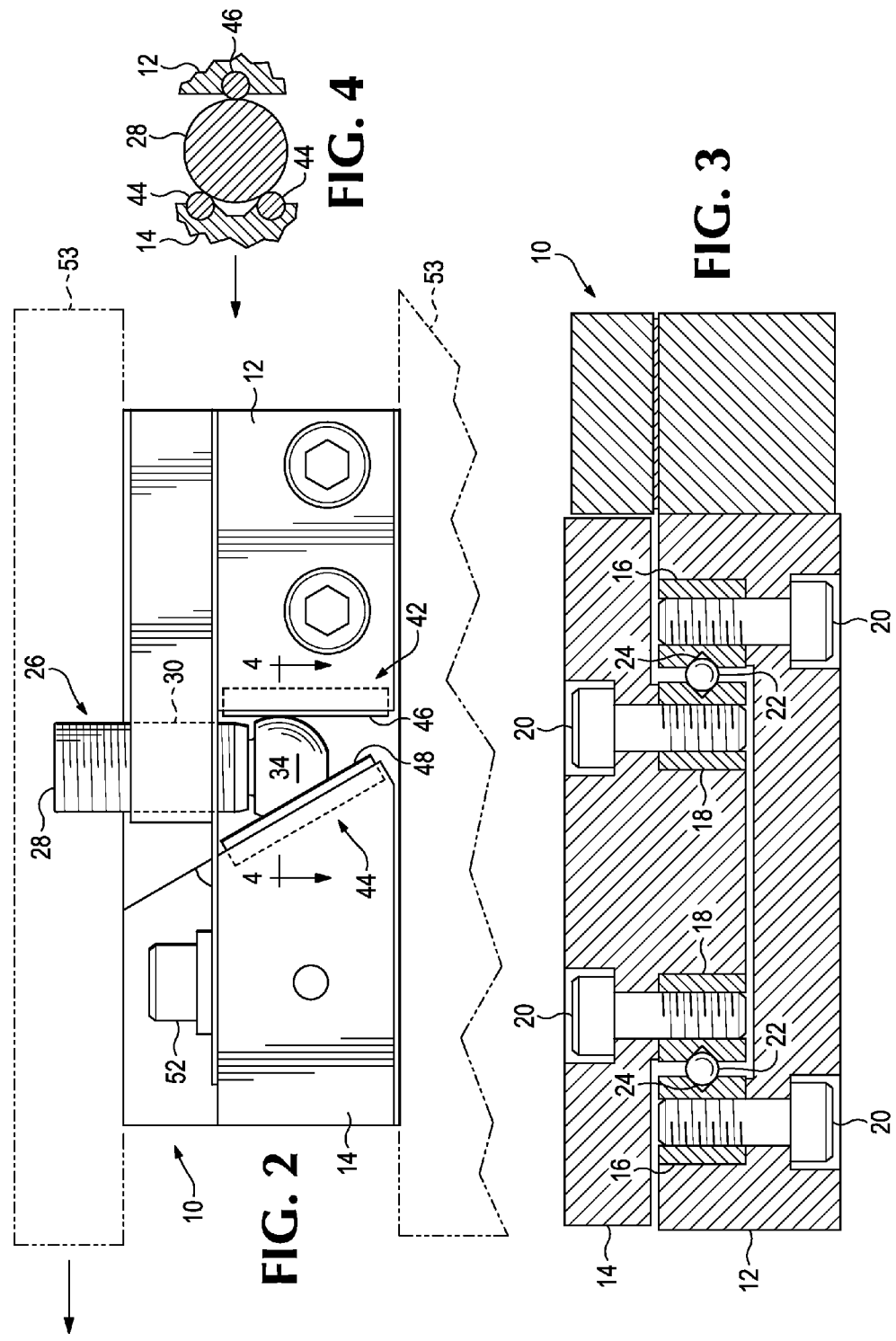

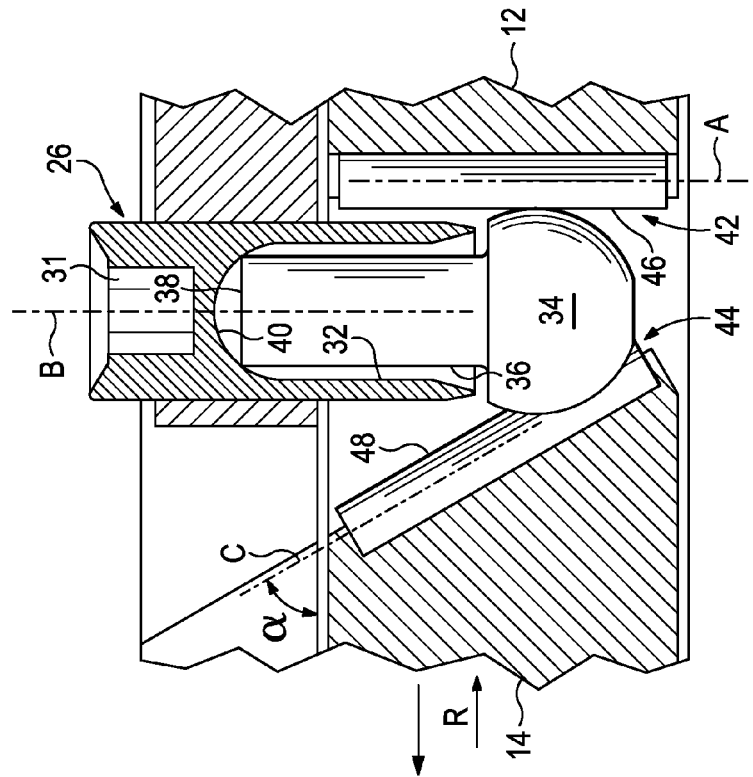
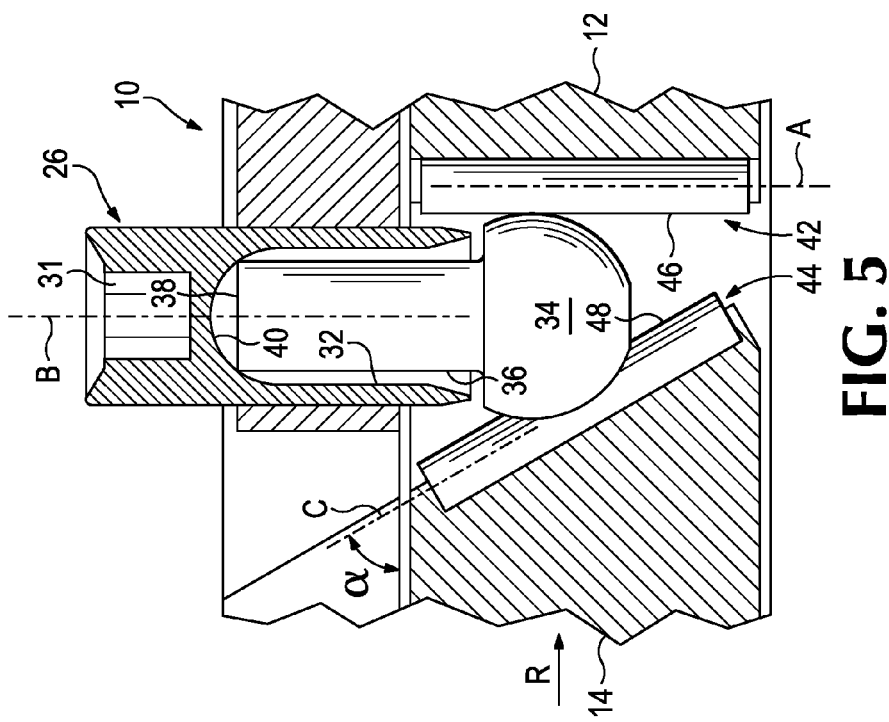
FIG. 5
FIG. 6

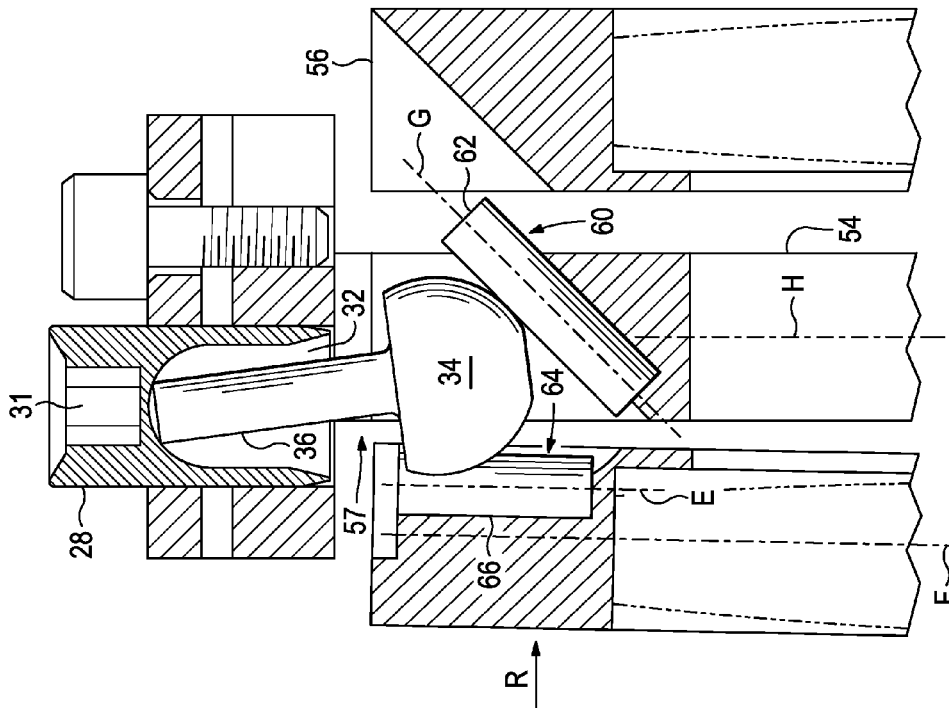
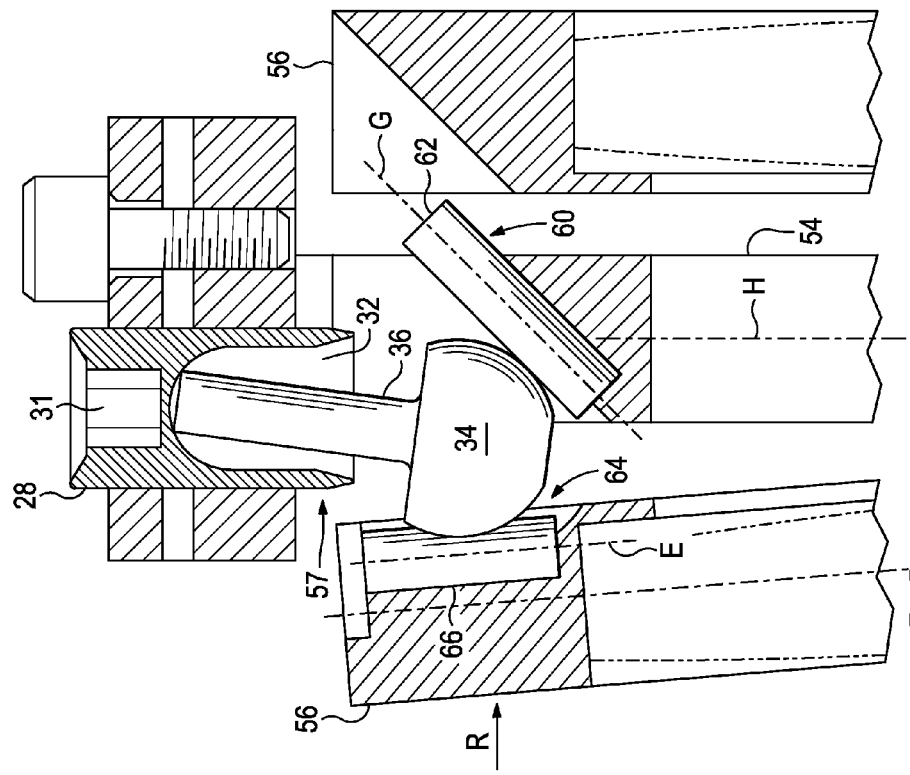

POSITIONING APPARATUS

BACKGROUND OF THE INVENTION

It often is desirable to be able to precisely move a device relative to a fixed reference point. In some applications the desired movement is linear and the element that is used to cause the movement moves at right angles to the direction the device moves. In other applications the desired movement is rotational and it may be desired to rotate two devices with respect to a fixed reference around different axes. In this case, it often is desirable that the elements that are used to cause the movement are located near one another and are moved in a common direction.

BRIEF SUMMARY OF THE INVENTION

The subject invention provides a fixed element and a moveable element which is moveable relative to the fixed element. A first guide element is attached to the fixed element and a second guide element is attached to the moveable element. An adjustment mechanism associated with the first and second guide elements is moveable relative to the fixed element along a first axis. Movement of the adjustment mechanism along the first axis causes the moveable element to move relative to the fixed element in a direction that is not parallel with the first axis.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is a side elevational view of the positioning apparatus shown in FIG. 1.

FIG. 3 is a cross sectional view, at an enlarged scale, taken along the line 3-3 in FIG. 1.

FIG. 4 is a fragmentary cross sectional view taken along the lines 4-4 in FIG. 2.

FIGS. 5 and 6 are fragmentary cross sectional views showing the operation of the positioning apparatus.

FIGS. 15 and 16 are perspective cross sectional views showing the operation of the positioning apparatus shown in FIG. 11.

DETAILED DESCRIPTION OF PREFERRED EMBODIMENT

Figure 1:
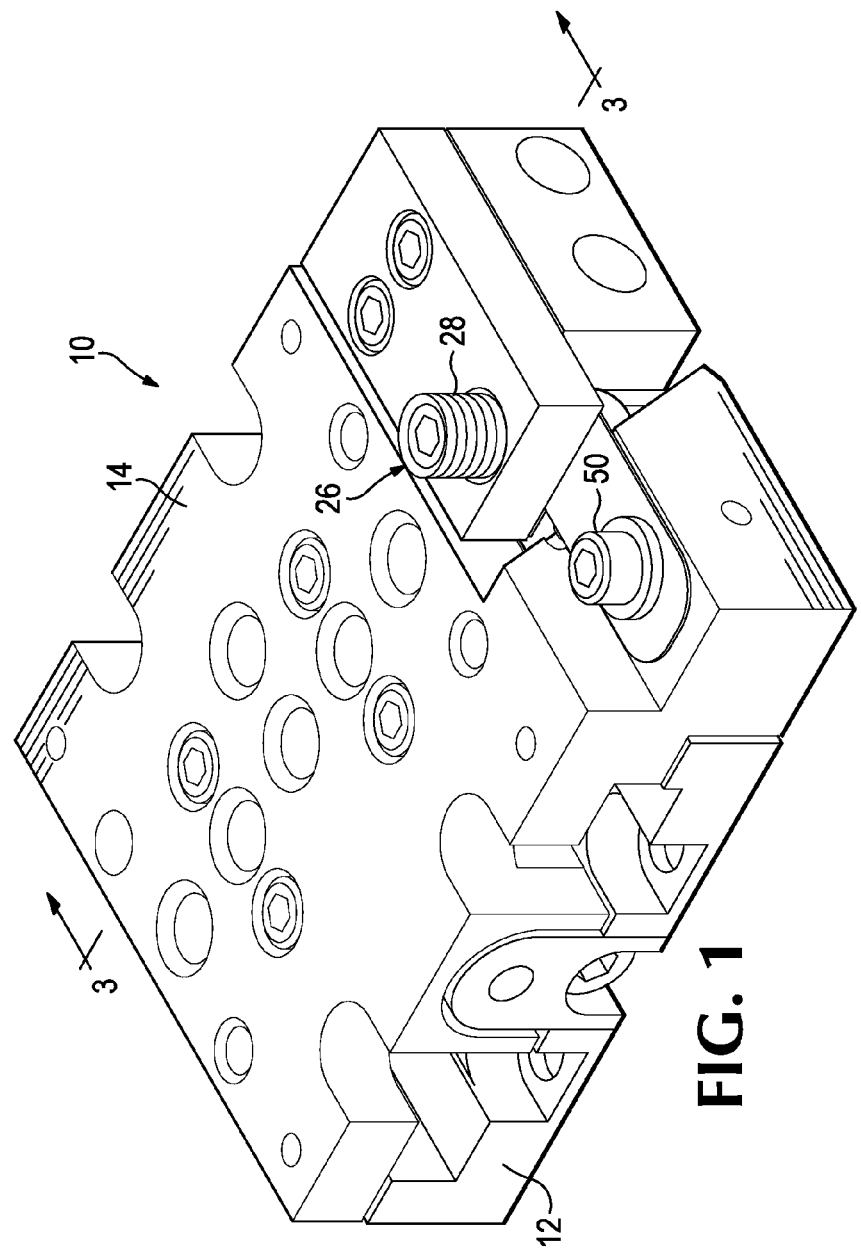
FIG. 1 is a perspective view of a positioning apparatus embodying the subject invention.
Figure 7:
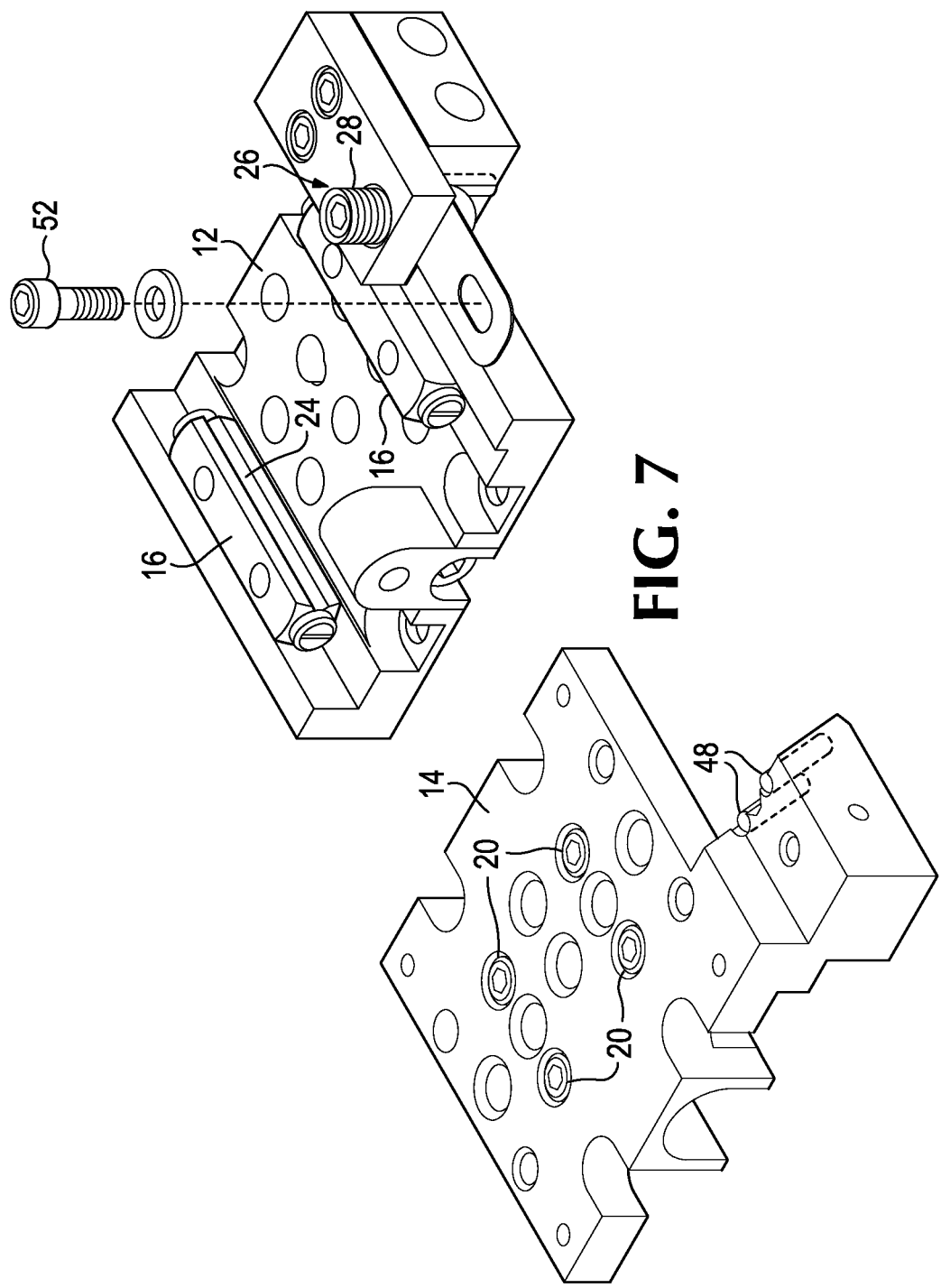
FIG. 7 is an exploded perspective view of the positioning apparatus shown in FIG. 1.
Figure 9:
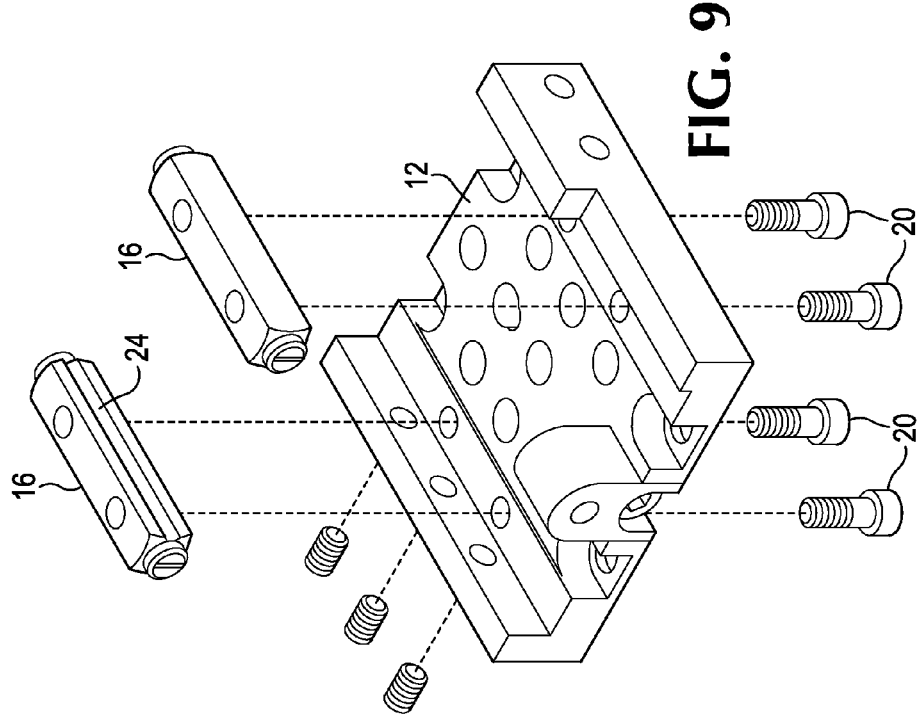
FIGS. 8-10 are exploded perspective views of different portions of the positioning apparatus.
Figure 8:
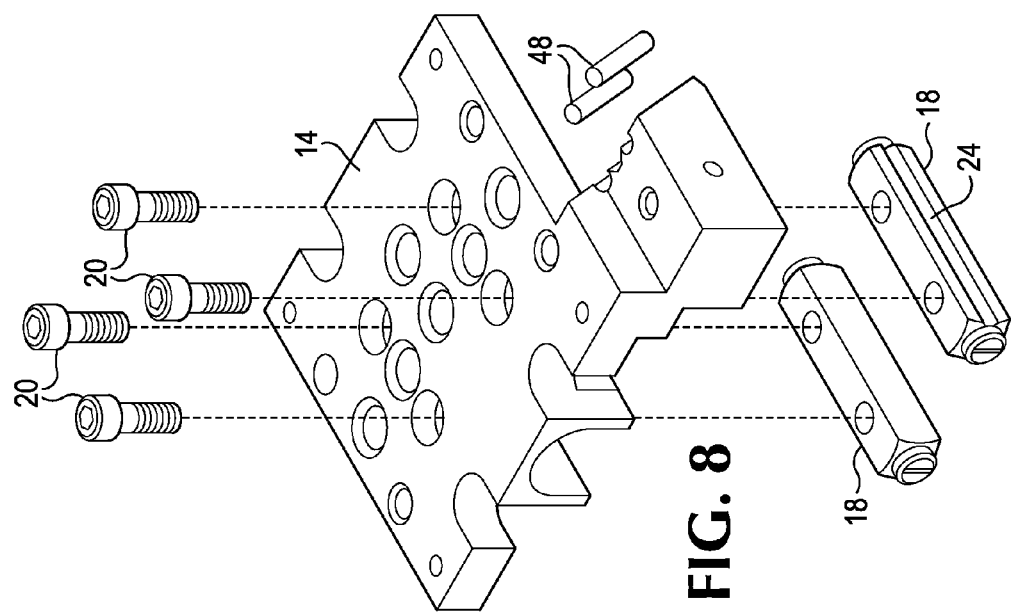
Figure 10:
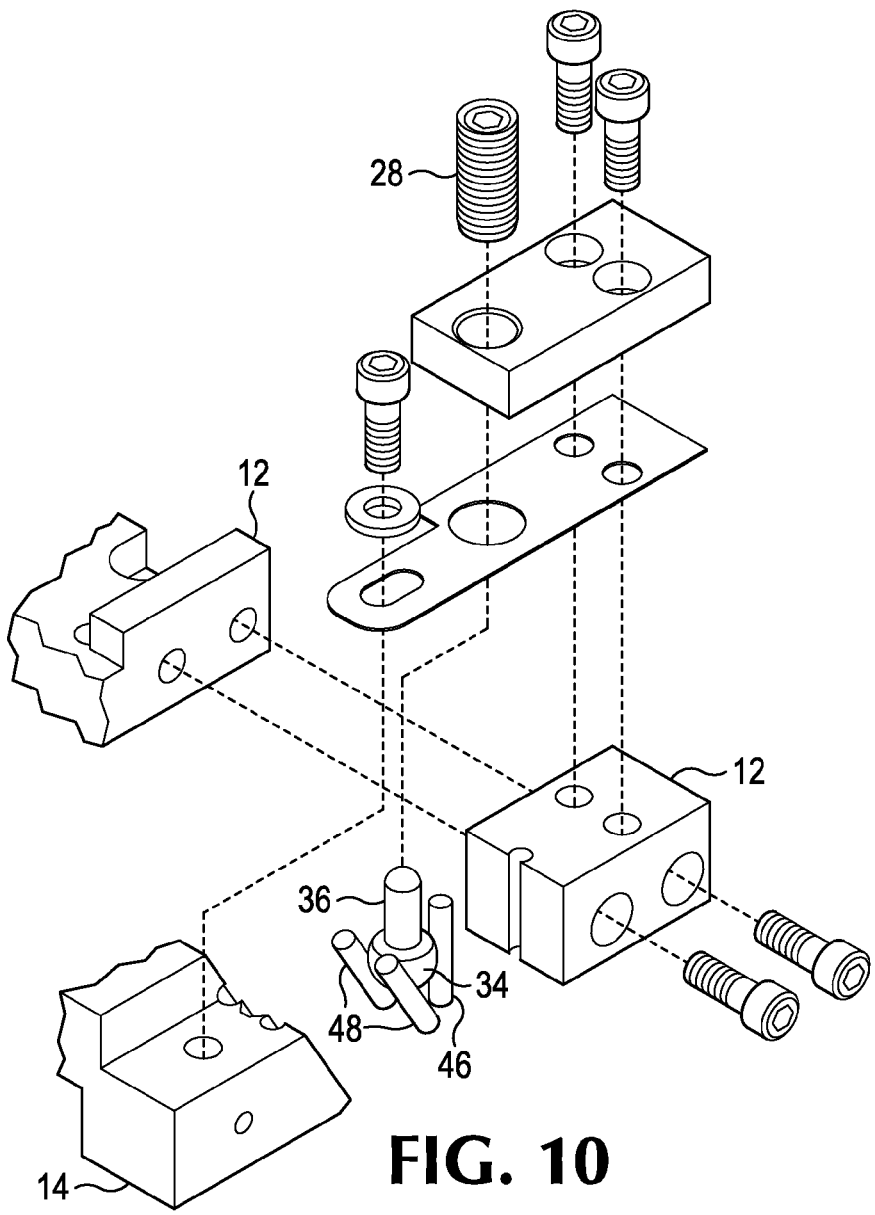
Figure 11:
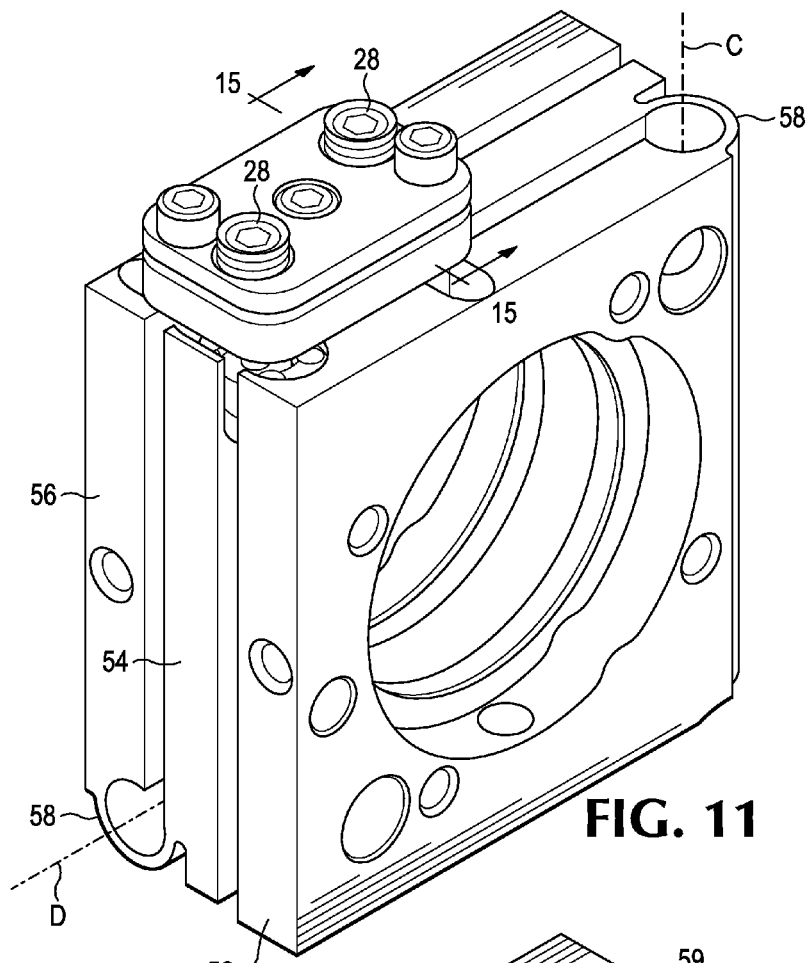
FIG. 11 is a perspective view of another embodiment of the positioning apparatus.
Figure 12:
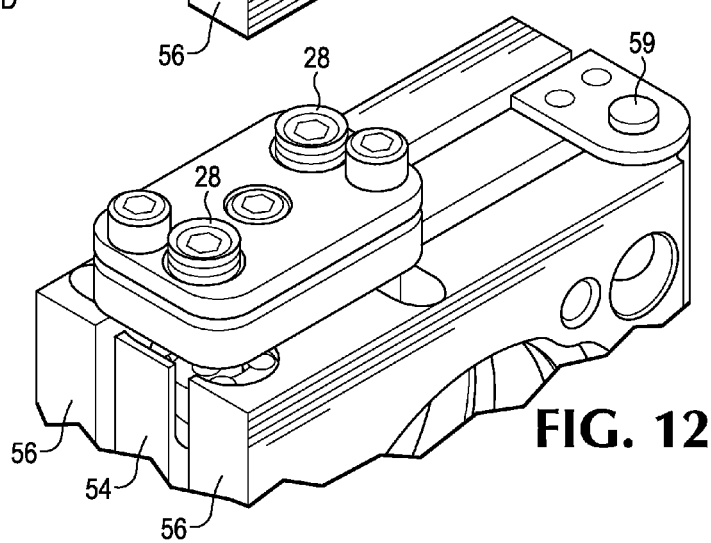
FIG. 12 is a fragmentary perspective view of an alternative hinged structure in the apparatus shown in FIG. 11.
Figure 13:
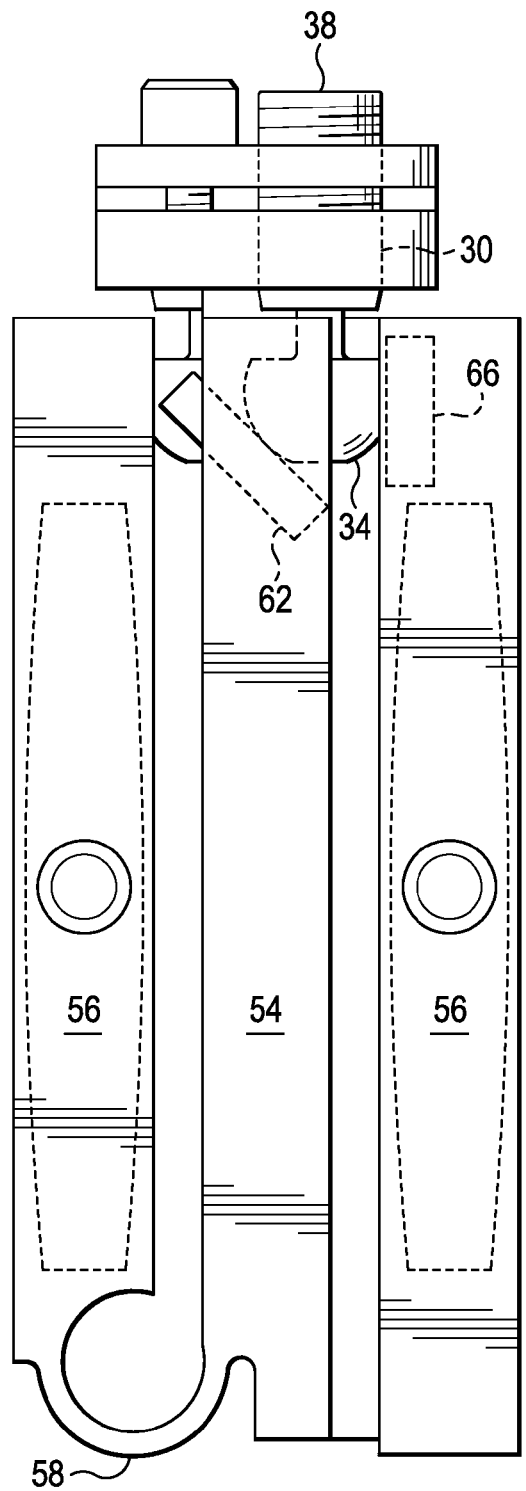
FIG. 13 is an end elevation view of the positioning apparatus shown in FIG. 11.
Figure 14:
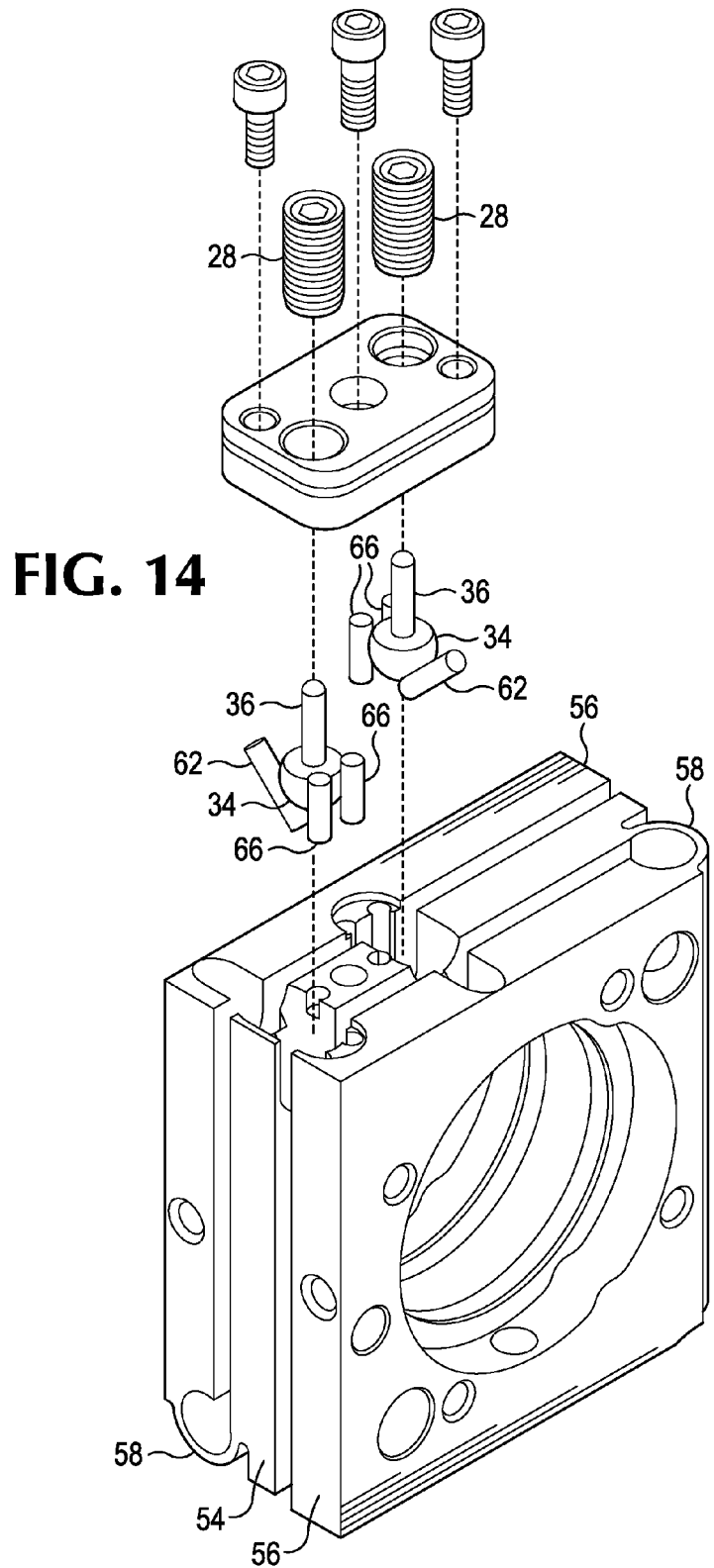
FIG. 14 is an exploded perspective view of the positioning apparatus shown in FIG. 11.

Referring now to FIGS. 1 and 7 of the drawings, a positioning apparatus 10 includes a fixed element 12 and a moveable element 14 which is moveable relative to the fixed element. In a first embodiment, shown in FIGS. 1-10, mating tracks 16 and 18 are attached to the fixed and moveable elements respectively by means such as screws 20, FIGS. 8 and 9. Ball or crossed-roller bearings 22 are placed between adjoining races 24 in the tracks, FIG. 3. An adjustment mechanism 26, located in the fixed element 12, is used to move the moveable element relative to the fixed element. In the embodiment illustrated the adjustment mechanism 26 includes a threaded adjustment screw 28 which extends through a threaded opening 30 in the fixed element 12. A cavities 31 is located in the upper end of the adjustment screw to facilitate rotating. The cavity can be a straight slot for a slot screw driver, a slot for a Phillips head screw driver, a square opening for a socket drive, or any other desired shape. Alternatively, a knob (not shown) can be attached to the end of the adjustment screw to assist in rotating it. A motor (not shown) could be connected to the adjustment screw to automate its rotation. If even more precise movement is required the motor can be computer controlled.

Referring now to FIGS. 5 and 6, the adjustment screw 28 also has a cavity 32 opening out of its lower end. A semi-spirodial drive head 34 is attached to a drive rod 36 which loosely extends into the cavity 32. The end 38 of the drive rod 36 which fits into the cavity 32 and the bottom 40 of the cavity have mating semi-spirodial surfaces. Thus, the drive rod 36 can pivot relative to the adjustment screw 28. The drive head 34 is in contact with a first guide element 42 which is attached to the fixed element 12 and a second guide element 44 which is attached to the moveable element 14. In the embodiment illustrated in FIGS. 1-10, the first guide element 42 is a single elongate cylindrical rod 46 which has an elongate axis A which is parallel with the center axis B of the drive rod 36. The second guide element 44 is a pair of elongate cylindrical rods 48 which have parallel elongate axes C which are off set from the center axis B by an attack angle $\alpha$.

As the adjustment screw 28 is moved into the threaded opening 30 in the fixed element 12 one side of the drive head 34 bears against the single rod 46 and the other side of the drive head bears against the pair of rods 48. Referring now also to FIG. 4, if the pair of rods 48 are separated from one another by a distance which places them equal distance from the center axis B and the axis A of the single drive rod, the drive head will be captured by the rods and will move linearly along the center axis B. As the drive head moves it will push the moveable element 14 outwardly at 90 degrees relative to the center axis B. A resistance force R is applied to the moveable element 14 to urge the pair of rods 48 against the drive head and the drive head against the single rod 46. This holds the drive rod 36 in the cavity 32 in the adjustment screw and keeps the center axis B aligned with the axis A. This resistance can be provided by a load created by the device being moved by the apparatus or by a spring (not shown).

The rate at which rotation of the adjustment screw causes linear movement of the fixed element depends on the pitch of the threads in the adjustment screw and the threaded opening 30 and the $\alpha$ of the pair of rods 48 with respect to the center axis B. For example, 360 degrees of rotation of a 30 thread per inch adjustment screw with a pair of rods 48 oriented at an angle $\alpha$ of 45 degrees cause the moveable element 14 to move 0.0125 inch. If the angle $\alpha$ is 55 degrees the moveable element would move 0.0087 inch. To this end, multiple moveable elements 14, each having a different angle $\alpha$ can be provided. Preferably the angle $\alpha$ would be between 20° and 80° from vertical. The fact that the drive head is semi-spirodial and bears on cylindrical rods minimizes the contact between the drive head and the guide elements 42, 44 which reduces the rotational torque opposing the rotating drive screw. A set screw 52 can be tightened when the moveable element is at the desired location to lock the apparatus in place.

The fixed element and moveable element can be attached to any type of device 53 where precise linear movement is required. It is particularly useful in situations where there is not room for a coaxial adjustment mechanism.

Referring now to FIGS. 11-16, in a second embodiment of the invention the adjustment screw 28, threaded opening 30, drive head 34 and drive rod 36 are identical to the first embodiment. In the second embodiment, there is a fixed element 54 and two moveable elements 56, one of which is located on each side of the fixed element. Each moveable element is attached to the fixed element by means of a hinge 58 which allows the moveable element to rotate relative to the fixed element. The hinges rotate about axes C and D which in the embodiment illustrated are at right angles to one another. In the embodiment illustrated in FIGS. 11 and 13-16, the hinges 58 are thin flexible members which provide resistance to rotation of the moveable element. However, the hinges can also be a pin type hinge 59, FIG. 12. In this embodiment there are two adjustment mechanisms 57, one for each moveable element 56. Referring now to FIGS. 15 and 16, in both adjustment mechanisms 57 the first guide element 60 is a pair of rods 62 which are attached to the fixed element 54, and the second guide element 64 is a single rod 66 which is attached to the moveable element 56. The single rod has an axis E which is parallel with the axis F of the moveable element, and the pair of rods 62 have an axis G which is angled with respect to the axis H of the fixed element.

In this embodiment the drive rod 26 and drive 34 will rotate relative to the adjustment screw 28 as the adjustment screw is moved into and out of the threaded opening 30. When the adjustment screw 28 is fully retracted in the fixed element 54, FIG. 16, the drive head 34 is moved up the pair of pins 62 and the drive rod 36 is rotated in the cavity 32 toward the fixed element 54. This allows the moveable element 56 to be rotated to where the end containing the single rod 66 is closer to the fixed element than the end containing the hinge 58. Conversely, when the adjustment screw 28 is fully inserted into the fixed element 54, FIG. 15, the drive head 34 is moved down the pair of rods 62 and the drive rod 36 is rotated in the cavity 32 away from the fixed element. This causes the moveable element to be rotated to where the end containing the single rod 66 is further from the fixed element than the end containing the hinge 58.

As was the case in the first embodiment, a resistance force R is applied to the movable element to urge the end containing the single rod toward the fixed element. This resistance force can be a load from the device being rotated or a spring (not shown). The other moveable element 56 is rotated about its axis C in the same manner.

This embodiment causes linear movement along a first axis to be converted to rotational movement around another axis in a precise controlled manner. With this embodiment a lens (not shown) can be attached to each fixed element and then the two lenses can be rotated independently of one another to focus on something.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A positioning apparatus comprising:
   (a) a fixed element;
   (b) a moveable element which is moveable relative to said fixed element;
   (c) a first guide element which is attached to said fixed element;
   (d) a second guide element which is attached to said movement element;
   (e) an adjustment mechanism which is operably associated with said first and second guide elements and is moveable relative to said fixed element linearly along a first axis;
   (f) wherein movement of said adjustment mechanism along said first axis causes said second guide element to move in a direction other than parallel said first axis; and
   (g) said adjustment mechanism includes a semi-spirodial drive head which is in contact with said first and second guide elements.

2. The positioning apparatus of claim 1 wherein said first and second guide elements are elongate cylindrical rods.

3. The positioning apparatus of claim 1 wherein said adjustment mechanism includes a threaded opening in said fixed element and a threaded adjustment screw, and rotation of said threaded adjustment screw causes it to move into and out of said threaded opening.

4. The positioning apparatus of claim 1 wherein said drive head is attached to said adjustment screw.

5. The adjustment apparatus of claim 4 wherein said adjustment screw includes a cavity in one end thereof, said drive head is attached to a drive rod and said drive rod fits in said cavity.

6. The positioning apparatus of claim 5 wherein an end of said drive rod fits into said cavity is semi-spirodial and a bottom of said cavity which contacts said end of said drive rod is matingly semi-spirodial such that said drive rod can pivot relative to said adjustment screw.

7. The positioning apparatus of claim 5 wherein said first guide element prevents said drive head from pivoting in said cavity.

8. The positioning apparatus of claim 1 wherein said moveable element moves in a linear direction which is normal to said first axis.

9. The positioning apparatus of claim 1 wherein a resistance force is applied against the movement of said moveable element.

10. The positioning apparatus of claim 1 wherein:
    (a) said first guide element is an elongate, cylindrical first rod which is attached to said fixed element, said first rod having a longitudinal axis which is parallel with said first axis; and
    (b) said second guide element is a pair of parallel, side-by-side elongate, cylindrical second rods having longitudinal axes which are at an attack angle with respect to said first axis.

11. The positioning apparatus of claim 10 wherein said attack angle can be changed.

12. The positioning apparatus of claim 1 wherein:
    (a) said first guide element is a pair of parallel side-by-side, elongate, cylindrical first rods having longitudinal axes which are at angle with respect to said first axis; and
    (b) said second guide is an elongate, cylindrical, second rod.

13. The positioning apparatus of claim 12 wherein a resistance force is applied against the movement of said moveable element.

14. The positioning apparatus of claim 12 wherein said moveable element has a first elongate axis and said second rod has an elongate axis which is parallel with said first elongate axis.

15. The positioning apparatus of claim 14 including a hinge which connects said moveable element rotatably to said fixed element.

16. The positioning apparatus of claim 15 wherein movement of said adjustment mechanism relative to said fixed element causes said moveable element to rotate relative to said fixed element.

17. The positioning apparatus of claim 15 wherein there are two of said moveable elements each having a separate hinge which allows each said moveable element to rotate around a different axis.

18. The positioning apparatus of claim 12 wherein said adjustment mechanism includes a threaded opening in said fixed element and a threaded adjustment screw, and rotation of said adjustment screw causes it to move into and out of said threaded opening.

19. The positioning apparatus of claim 18 including a semi-spirodial head which is attached to said adjustment screw.

20. The positioning apparatus of claim 19 wherein said adjustment screw includes a cavity in one end thereof and said semi-spirodial head is attached to a drive rod, which fits loosely in said cavity.

21. The positioning apparatus of claim 20 wherein an end of said drive rod which fits into said cavity is semi-spirodial and a bottom of said cavity which contacts said end of said drive rod is matingly semi-spirodial such that said drive rod can pivot in said adjustment screw.

22. The position apparatus of claim 21 wherein said drive rod rotates relative to said adjustment screw as said adjustment screw moves.

23. A positioning apparatus comprising:
   (a) a fixed element;
   (b) a moveable element which is moveable relative to said fixed element;
   (c) a first guide element which is attached to said fixed element;
   (d) a second guide element which is attached to said movement element;
   (e) an adjustment mechanism which is operably associated with said first and second guide elements and is moveable relative to said fixed element linearly along a first axis;
   (f) wherein movement of said adjustment mechanism along said first axis causes said second guide element to move in a direction other than parallel said first axis; and
   (g) said first and second guide elements are elongate cylindrical rods.

24. A positioning apparatus comprising:
   (a) a fixed element;
   (b) a moveable element which is moveable relative to said fixed element;
   (c) a first guide element which is attached to said fixed element;
   (d) a second guide element which is attached to said movement element;
   (e) an adjustment mechanism which is operably associated with said first and second guide elements and is moveable relative to said fixed element linearly along a first axis;
   (f) wherein movement of said adjustment mechanism along said first axis causes said second guide element to move in a direction other than parallel said first axis; and
   (g) said drive head is attached to said adjustment screw.

25. A positioning apparatus comprising:
   (a) a fixed element;
   (b) a moveable element which is moveable relative to said fixed element;
   (c) a first guide element which is attached to said fixed element;
   (d) a second guide element which is attached to said movement element;
   (e) an adjustment mechanism which is operably associated with said first and second guide elements and is moveable relative to said fixed element linearly along a first axis;
   (f) wherein movement of said adjustment mechanism along said first axis causes said second guide element to move in a direction other than parallel said first axis; and
      (i) said first guide element is a pair of side-by-side elongate, cylindrical first rods having longitudinal axes which are at an angle with respect to said first axis; and
      (ii) said second guide element is an elongate, cylindrical, second rod.

* * * * *